Oct. 10, 1961  M. J. COHEN ET AL  3,004,258

CONTROL AND GUIDANCE OF VEHICLES

Filed Aug. 20, 1956  2 Sheets-Sheet 1

MARTIN J. COHEN
HENRY C. GIBSON JR.
INVENTORS

BY  *Bruce L. Lamb*

ATTORNEY

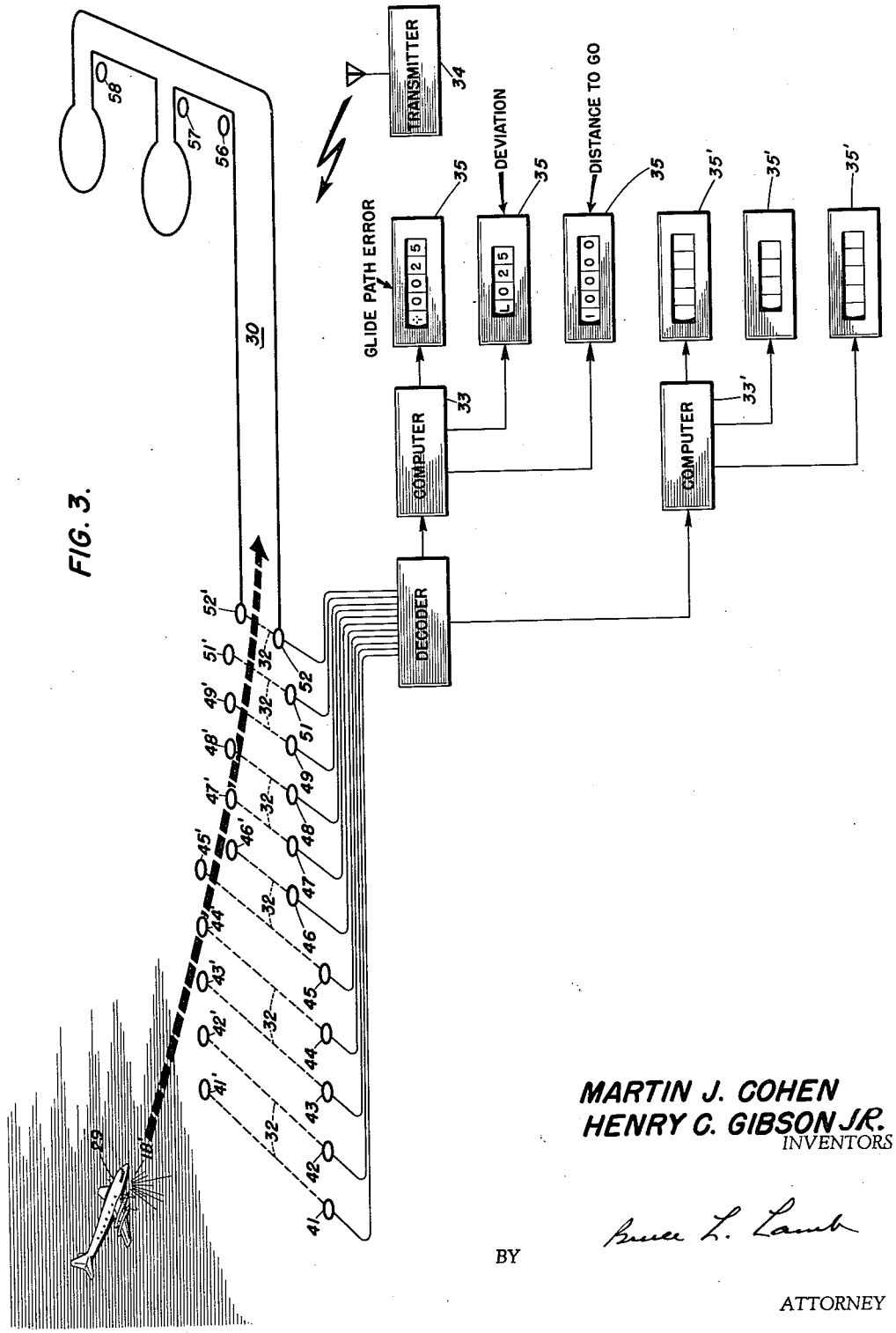

United States Patent Office 3,004,258
Patented Oct. 10, 1961

3,004,258
CONTROL AND GUIDANCE OF VEHICLES
Martin J. Cohen, West Palm Beach, and Henry C. Gibson, Jr., Palm Beach, Fla., assignors to Franklin Systems, Inc., Bridgeport, Pa., a corporation of Florida
Filed Aug. 20, 1956, Serial No. 604,970
8 Claims. (Cl. 343—112)

The present invention relates in general to vehicular control and guidance systems, and more particularly to devices for rapidly indicating the location of a vehicle with respect to particular stations.

The invention will be first described as applied to surface traffic control, but it will later be appreciated that the full potential of its advantages can best be realized by application to air traffic control, particularly in the vicinity of airports.

Present air traffic controls rely primarily upon radiation lying either in the radio band of frequencies or upon radiation lying in the visual band of frequencies. The shortcomings of apparatus operating in either band should be evident. Devices relying upon visual radiation are virtually inoperative in dense fogs. Radio devices operating in the lower frequency bands do not possess adequate directivity. At higher radio frequencies, although it may be possible to lay down a guidance path as narrow as ½ degree in beam width and thereby provide adequate directivity, pulse ranging devices require pulses of such short duration at close range that resolution deteriorates below acceptable values.

Ground control approach systems require the exercise of skill and judgment upon the part of the operator. With several aircraft under control, there is likelihood of confusion of the identity of aircraft, or, with high speed aircraft, the operator may not be capable of rapid decisions necessary for safe control.

Accordingly, it is an object of the present invention to provide a traffic control for vehicles.

Another and more specific object is to provide a traffic control including a blind landing system for aerial vehicles.

Still another object of this invention is to provide a traffic control in which individual vehicles may be identified and whose positions will be located.

A further object of the invention is to provide a means for guiding vehicles in which the mobile equipment is reduced to an extremity simple device, thereby affording reliability in operation, a saving in the weight of the equipment, and a conservation in space requirements.

Yet another object is to provide a means for determining the range from a known point, or points, to an object moving at relatively high speed.

Other objects and many advantages of the invention will be evident as an understanding of the invention is gained through study of the following description and the accompanying drawings.

Briefly, the present invention comprises a radioactive emitter, mounted upon the vehicle whose position or course is to be determined. A plurality of detectors of particle radiation provide a means for determining the range to the radioactive emitter on the vehicle. Means are provided for identifying individual vehicles by modulating the particle radiation from their emitters.

In the drawings:

FIG. 3 is a schematic drawing, largely in pictorial form, of the invention as applied to the control of aircraft.

Figure 1:
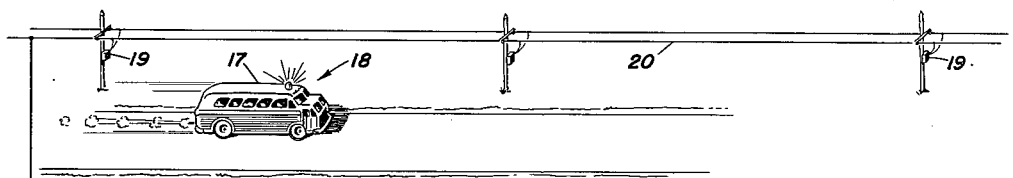
FIG. 1 is a schematic drawing, largely in pictorial form, illustrating the invention as applied to surface vehicles.

In FIG. 1, the present invention is shown as applied to surface vehicular traffic. In public transit systems, it is desirable for scheduling and dispatching purposes to have assembled in one central station the instant location of each operating unit of the line. A transit company, operating over fixed routes, usually would have no need of direct contact with their units, it being adequate to have knowledge of the approximate progress of a unit along its route. The present invention, in its simplest embodiment, proves entirely adequate for these purposes.

Each bus 17 of the transit system is equipped with a radioactive emitter 18, which radiates energy in random particles, upwardly. At strategic locations along the route, detectors 19 are placed to receive the particle radiation and transmit, by means of land lines 20, information as to the location of the unit to the transit control center 26.

The strength of the radioactive emitter 18 need not be great. A millicurie would usually be adequate to raise the output of the detectors above the normal background output and thereby indicate the nearby presence of a vehicle. If more than one unit is operated over a single route, it is desirable to identify the vehicles individually, so that their progress along the routes may be marked.

Figure 2:
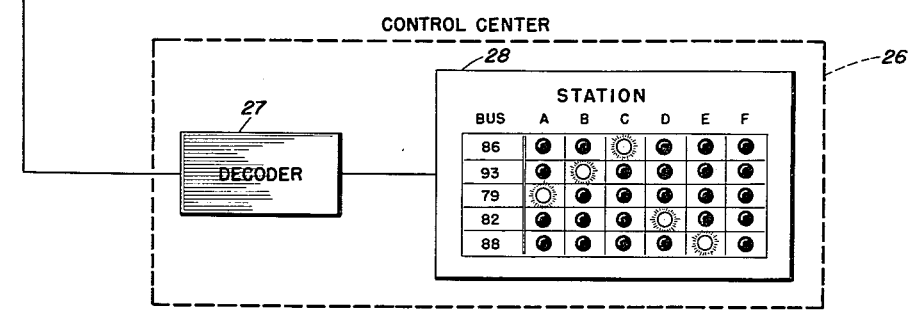
FIG. 2 is a perspective drawing of a modulator for adding identification information to the particle radiation of a radioactive emitter.
Figure 2:
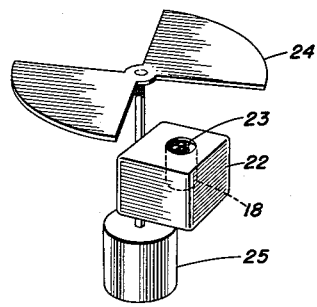

In FIG. 2, a modulator is shown which is capable of encoding the particle radiation emitted by the source 18, and thereby conveying identification to the control center 26. A casing 22 of dense absorbing material, for example, lead, partially encloses the radioactive element 18. Emission from the element 18 is radiated through an aperture 23. A shutter 24, formed of vanes of absorbing material, is rotated, so as to alternately close and open aperture 23. The shutter 24 is driven at constant speed by a motor 25. Radiation from the element 18 is suppressed whenever aperture 23 is closed by a vane of shutter 24. The detected radiation is consequently generally in the form of pulses, the frequency of which may be varied by altering the speed of motor 25, or the number of vanes composing the shutter 24.

Again referring to FIG. 1, the detectors 19 along the transit routes are linked by individual land lines 20 to the control center, but other obvious means, such as a radio link, may be employed.

At the control center 26, a decoder 27 separates the received signals according to their pulse repetition frequencies, for example, by tone controlled relays, and displays the results upon an illuminated dispatch board 28. The dispatch board 28 contains rows and columns of lights which are illuminated upon the passage of a transit unit and thus indicates the progress of particular vehicles.

The basic elements of the present invention may be extended to provide aircraft with navigational aids for runway approach and landing and for surface taxi control.

In FIG. 3, an aircraft 29 is shown in a runway approach controlled by means of the present invention. A modulated radiation source 18', of the type illustrated in FIG. 2, is mounted on the aircraft 29. Spaced along the approach path to the runway 30 are a plurality of radiation detectors, 41–41', 42–42', etc., preferably of the scintillation type, to provide maximum sensitivity. As will be more specifically detailed hereinafter, the detectors 41–41', 42–42', etc., are each capable of measuring the range to the radiating source 18'. The detectors are linked by land lines 32 to an electronic computer 33, which solves the equations of motion of the aircraft and whose solutions are relayed to the aircraft 29, by a radio transmitter 34. The solution of computer 33 indicates the aircraft deviation in feet left or right from the runway axis, its error in altitude above or below the correct glide path, and its distance to go to touchdown.

The exact spacing of the detectors 41–41', 42–42', etc., along the runway approach depends upon the detector sensitivity, the strength of the radiation source 18', and the desired accuracy of range measurement. As a specific example, assume that the source 18' is a mass of cobalt 60 emitting 10 curies of radiation isotopically through a $2\pi$ solid angle facing downward.

For an aircraft approaching the runway at a ground speed of 120 m.p.h., a suitable arrangement includes spacing each of the detectors 41–41' through 45–45', 300 feet laterally from the axis of the runway, and longitudinally at half-mile intervals, commencing at 3.8 miles from the runway end. Commencing with detectors 46–46', the spacing interval is decreased to .3 mile longitudinally and to 200 feet laterally on either side of the runway axis. Detectors 52—52' mark the runway end.

For landing control, the apparatus functions in the following manner:

The counting rate, $I_1$, of a scintillation type radiation detector, varies according to the following relationship:

$$I_1 = \frac{I_0 K}{R_1^2} \text{ counts/second} \qquad (1)$$

Wherein $I_0$ is the strength of the radiation source in curies,
$K$ is a constant, and
$R_1$ is the range from the source to the detector.

It will be seen that the counting rate varies inversely as the square of the range, and hence the range from a single detector to a source of known intensity can be determined by measurement of the counting rate.

The accuracy with which range measurements may thus be made depends upon the time duration of measurement and the signal count as compared to the background count. The duration of measurement is a factor in the accuracy of computation since the emission from the source is random. It is desirable that the signal count be as high as practicable without endangering the public or aircraft passengers. A source having a strength of 10 curies is suitable for use herein, as it can be shown that with a commercially available scintillation type detector, range measurements accurate to within 10% can be obtained for a range of about 1000 feet. At a range of about 400 feet, the accuracy increases to 1%. The detector outputs are decoded in a decoder 27', so as to separate signals from several aircraft which may be simultaneously within range of the detectors. The decoded signals are applied to the computer 33, which measures the counts registered by the various detectors nad performs the range computation according to Equation 1. Since distances from at least three of the detectors are known, a fix of the aircraft position can be obtained by a simple trigonometric computation within the computer 33. Further, since the detectors are so located as to permit the position of the aircraft to be determined continuously, it is a mere mathematical problem to arrange the computer to provide information as to the aircraft's deviation from the runway axis, error in altitude, distance to go, rate of descent, etc.

The computer, preferably of the digital type, is capable of performing the necessary computations with rapidity and presents the results continuously to the traffic control operator upon counter type indicators 35. Indicators may be provided for the indication of any desired coordinates of the aircraft course, but the information of most vital interest to the aircraft pilot relates to his deviation right or left of the runway, glide path error, and distance to go to touchdown. This information is vocally relayed to the pilot by the traffic control operator by means of radio transmitter 34.

If the two aircraft are making simultaneous runway approaches, each aircraft employs distinctive modulation for identification. Decoder 27' supplies the individual aircraft signals to separate computers 33 and 33', which separately indicate the glide path errors, etc., of the two aircraft.

Instead of a "talk down" procedure, it is a comparatively simple matter to transmit the information directly to the aircraft without the intervention of the traffic control operator. Direct transmission has the advantage of supplying continuous information to the pilot, and, if desired, the transmitted information may be fed into the aircraft's autopilot and thereby provide a completely automatic airport traffic control system. The advantages of direct transmission of information can be had at only a small expense of increased airborne equipment. For example, the transmitted radio signal may be pulse modulated by the computer in the binary code, while the airborne equipment would comprise a receiver, and means for presenting the received numbers to the pilot in decimal form.

Once upon the ground, the aircraft can be directed to a particular parking location by means of detectors placed at taxiway turnoffs and intersections such as are indicated at 56, 57, and 58. The taxiway detectors may be utilized to indicate the aircraft's progress to a parking location upon a board similar to dispatch board 28 of FIG. 1. Whenever the aircraft is not operating under control of the present invention, the emitter 18' is sealed within its housing, thereby preventing injury to bystanders or maintenance personnel.

It should be noted that simultaneous range measurement by a plurality of detectors permits the elimination of the constant factors from Equation 1. Therefore, it is unimportant that the exact strength of the radiating source 18' be known, so long as the source has sufficient life to maintain substantially constant strength during a particular series of range measurements. Thus, if it is desired to obtain range measurements to an object having an extremely high speed, the radiating source may comprise an intensely active substance having a relatively short half-life, say even as low as three minutes. When the object later comes to rest, the radioactivity will have decayed to a safe level to permit ease of recovery and handling.

Obviously, the invention may be practised by means equivalent to those specifically detailed herein. It should therefore be understood that the invention is limited only by the scope of the appended claims.

What is claimed and desired to be secured by Letters Patent is:

1. A vehicle locator, comprising a source of radioactivity, a housing for containing said source, said housing being provided with an aperture therein to permit the escape of radioactive particles and being adapted for mounting upon the vehicle to be located, means for modulating the radioactive particles emitted by said source to identify radiation from said source, a plurality of detectors of radioactivity, each providing outputs upon the reception thereby of radioactive particles, the location of said detectors having been predetermined, means for conveying said detector output to a common location, means for decoding said detector outputs at said common location to identify the radiating source according to the modulation impressed upon said outputs, and means for receiving the output of said decoder for presenting a visual indication of the identity and location of the radiating source.

2. Apparatus for measuring the range from fixed points to a moveable object, comprising a radioactive emitter mounted upon said moveable object, a plurality of radiation detectors fixed with respect to one another, said detectors providing discrete outputs for a predetermined percentage of the radiation particles impinging thereupon, means for determining the time rate of the outputs of each of the said detectors, the time rates of said detector outputs being inversely proportional to the square of the distance between said radioactive emitter and each of said detectors, and computing means for determining factors proportional to the distance from said emitter to each of said detectors by extracting the square root of the reciprocal of said time rate of detector outputs and for determining the range from a fixed point to said moveable object by trigonometric combination of said distance factors.

3. Apparatus as claimed in claim 2 with additionally, means for modulating the particle radiation emanating from said emitter to identify said detector outputs as having been stimulated by said emitter.

4. A range measuring device comprising, an emitter of radioactive particles, a plurality of spaced counters of radioactive particles, each of said counters providing an indication of the intensity of radiation at their location, said counters being spaced apart by known distances, and a computer receiving the output of each of said counters, said computer being arranged to provide the solution in terms of range to the equation $$I_1 = \frac{I_0 K}{R^2}$$

wherein $I_1$ is the counting rate of a particular one of said counters, $I_0$ is the strength of said emitter expressed in particles per second, K is a constant and R is the distance separating said emitter from a particular counter.

5. An aircraft landing system comprising, an emitter of radioactive particles aboard the aircraft whose runway approach is to be controlled, a plurality of radiation detectors spaced along the approach path to the runway, said detectors providing discrete outputs for a given percentage of the radiation particles passing therethrough, means for determining the time rates of outputs from each of said detectors, computing means receiving said time rates of detector outputs for computing the trajectory of the aircraft carrying said emitter of radioactive particles, and means for communicating the trajectory information output of said computer to the aircraft carrying said emitter of radioactive particles.

6. An aircraft landing system comprising, an emitter of radioactive particles mounted aboard the aircraft whose descent is to be controlled, the radiation from said emitter being substantially confined to a direction downward from the aircraft, a plurality of detectors of radioactive particles spaced laterally and longitudinally along the approach path to the runway, said detectors providing outputs upon the penetration thereof by radioactive particles, means receiving said detector outputs for computing the trajectory of the descending aircraft carrying said emitter, and means for transmitting the computed trajectory information to the descending aircraft.

7. Apparatus as claimed in claim 6 with additionally, means for modulating the radioactive particle emission from said emitter to identify said detector outputs as having been stimulated by said emitter.

8. An aircraft landing system comprising, a radioactive emitter mounted on the aircraft whose landing is to be controlled, means for cyclically absorbing a portion of the radiation particles from said emitter to add an identification code to the radioactive particles emanating from the aircraft, a plurality of detectors of radioactivity spaced along the approach path to the runway, a decoder receiving the outputs of each of said detectors, said decoder passing detector outputs possessing the identification code introduced by said absorbing means and rejecting other detector outputs, a computer receiving the output passed by said decoder for computing the distance from said emitter to said detectors providing outputs and for computing the trajectory of the landing aircraft from said computed distances, and means for transmitting the computed trajectory to the landing aircraft.

References Cited in the file of this patent

UNITED STATES PATENTS

| | | |
|---|---|---|
| 2,484,433 | Turner | Oct. 11, 1949 |
| 2,546,984 | Deloraine et al. | Apr. 3, 1951 |
| 2,624,877 | Chance | Jan. 6, 1953 |
| 2,700,111 | Jacobs et al. | Jan. 18, 1955 |
| 2,769,977 | Roberts et al. | Nov. 6, 1956 |

FOREIGN PATENTS

| | | |
|---|---|---|
| 664,192 | Great Britain | Jan. 2, 1952 |